A. J. SHORT.
GAS PRESSURE GOVERNOR.
APPLICATION FILED DEC. 26, 1911.
1,057,288.
Patented Mar. 25, 1913.
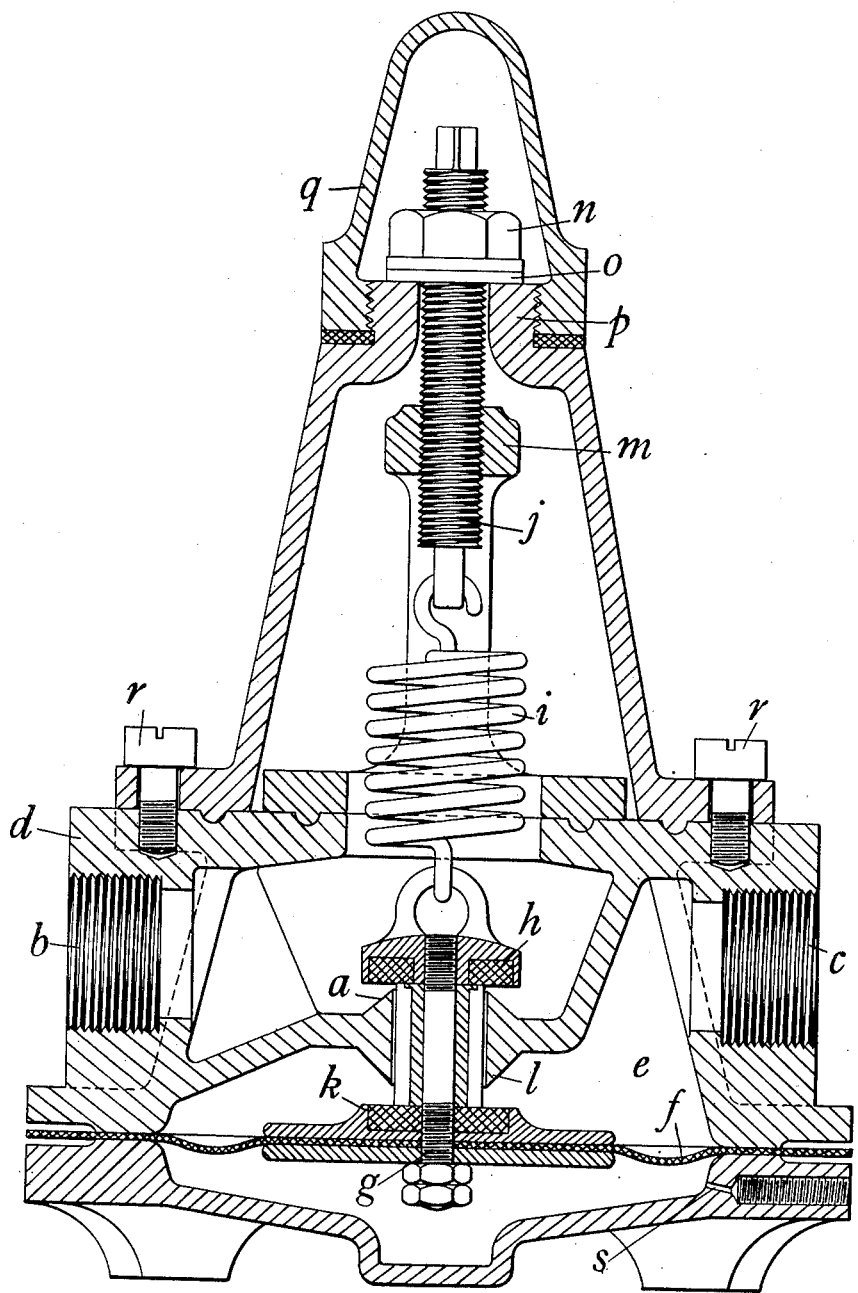
WITNESSES
Sidney Brooks
J. P. Davis
INVENTOR
Alfred James Short
BY Munn & Co
ATTORNEYS

UNITED STATES PATENT OFFICE.

ALFRED JAMES SHORT, OF BIRMINGHAM, ENGLAND.

GAS-PRESSURE GOVERNOR.

1,057,288.     Specification of Letters Patent.     Patented Mar. 25, 1913.

Application filed December 26, 1911. Serial No. 667,978.

*To all whom it may concern:*

Be it known that I, ALFRED JAMES SHORT, a subject of the King of Great Britain, residing at 435 City road, Edgbaston, Birmingham, England, gas engineer, have invented certain new and useful Improvements in Gas-Pressure Governors, of which the following is a specification.

The object of this invention is to construct an improved gas pressure governor of the type in which increase or diminution of gas pressure on a diaphragm causes a valve aperture to be diminished or increased.

In the accompanying sheet of explanatory drawing, the figure illustrates by vertical section a gas pressure governor constructed in accordance with this invention.

In carrying the invention into effect as shown in the drawing, a valve seating $a$ is arranged between an inlet $b$ and an outlet $c$ in a valve box $d$. In the chamber $e$ beneath the valve seating $a$ is arranged a flexible diaphragm $f$. The latter is connected by a stem $g$ with the principal valve $h$ which is acted upon by a tension spring $i$. The spring is adjustable by means of a screw $j$ to which the spring is connected. In conjunction with the diaphragm is arranged an auxiliary valve $k$ which can coöperate with a supplementary seating $l$ for interrupting the gas flow through the valve box.

The relative positions of the valves, diaphragm and seating shown in the drawing is that taken up when the gas pressure on the outlet side of the valve box lies between the limits for which the governor is adjusted. When the gas supply is cut off by a valve in the service main on the inlet side of the governor the spring draws up the auxiliary valve $k$ into contact with the supplementary seating $l$. This also occurs when the gas pressure on the outlet side falls below the minimum which maintains the flow through the governor, as, for example, in the event of rapid escape or perforation of the diaphragm. In the latter case a little gas escapes if the pressure on the upper side of the valve is sufficient to re-open the valve. But as soon as this occurs the pressure is relieved and the valve re-closes under the action of the spring. Alternate opening and closing continues, but the amount of gas permitted to pass in this process is insignificant as compared with the unimpeded outrush which occurs when no such auxiliary valve is employed.

Under normal conditions the valve $k$ remains open under the action of the gas pressure on its upper side and gas passes through to the outlet. Fluctuations of pressure between the limits for which the apparatus is constructed merely cause vertical upward or downward movements of the valves under the action of the gas pressure on the diaphragm, and thereby cause the gas-flow past the valve seatings to be varied accordingly. But if the pressure on the diaphragm becomes excessive it draws the main valve $h$ on its seating $a$ against the spring $i$ until the pressure on the outlet side of the governor subsides sufficiently to enable the spring to re-open the valve. Gas-flow through the governor is therefore interrupted both when the pressure exceeds one limit and falls below another limit.

The adjustment screw $j$ is carried in a bridge piece $m$ which is formed with open sides, and a lock nut $n$ on the outer end of the screw bears through an intermediate leather or other washer $o$ on the upper end of a cap $p$. The supplementary cap $q$ enables the nut and screw to be exposed for adjustment purposes. If it is desired to inspect the interior of the valve the cap $p$ is also removed (after withdrawal of the nut $n$ and screws $r$), the spring and valves being then exposed to sight through the openings in the bridge piece $m$. Beneath the diaphragm is provided an air vent $s$.

A gas governor as above described is applicable, more especially, to high pressure gas service mains. It may, however, be employed on any gas distributing system in which a device of that kind is required.

Having thus described my invention what I claim as new and desire to secure by Letters Patent is:—

In gas pressure governors comprising coaxially arranged main and auxiliary valves, seatings situated between the valves, a diaphragm in conjunction with the auxiliary valve, a tension spring attached to the main valve and an adjusting set screw for said spring, the combination comprising a bridge piece carrying the set screw, a cap open at its upper end inclosing the bridge piece, a lock nut resting on said cap, and a supplementary cap screwed on first named cap and inclosing said lock nut and upper end of screw, substantially as described.

In testimony whereof I have signed my name to this specification in the presence of two subscribing witnesses.

ALFRED JAMES SHORT.

Witnesses:
JOHN MORGAN,
FRANCIS MALPAS.